United States Patent [19]

Zamja et al.

[11] 4,195,907

[45] Apr. 1, 1980

[54] LIGHT-CONDUCTING FIBERS

[76] Inventors: Klaus Zamja, Sertoriusring 58, 65-Mainz-Finthen; Diethelm Goebel, Westring 32, 65-Mainz-Mombach, both of Fed. Rep. of Germany

[21] Appl. No.: 880,706

[22] Filed: Feb. 23, 1978

[30] Foreign Application Priority Data

Mar. 5, 1977 [DE] Fed. Rep. of Germany ... 7706786[U]

[51] Int. Cl.² ............................................. G02B 5/14
[52] U.S. Cl. ................................. 350/96.32; 362/32; 350/96.15; 350/96.10
[58] Field of Search .............. 350/96.10, 96.15, 96.32, 350/96.30; 362/32

[56] References Cited

U.S. PATENT DOCUMENTS

| | | | |
|---|---|---|---|
| 2,815,607 | 12/1957 | Schroeder | 362/32 |
| 3,516,239 | 6/1970 | Fukuda | 350/96.32 X |
| 3,535,018 | 10/1970 | Vasilatos | 362/32 |
| 3,653,739 | 4/1972 | Strack | 350/96.15 X |
| 3,767,910 | 10/1973 | Harrigan | 362/32 |

FOREIGN PATENT DOCUMENTS 196226  3/1908  Fed. Rep. of Germany ............ 362/32

OTHER PUBLICATIONS

T. B. Wielar, "Plastic Optical Fibers," Proceedings of the Society of Photo-Optical Instrumentation Eng. Seminar on Fiber Optics Come of Age, vol. 31, San Mateo, Calif., Oct. 1972, pp. 3–12.

*Primary Examiner*—Rolf G. Hille
*Attorney, Agent, or Firm*—Quaintance, Murphy & Richardson

[57] ABSTRACT

A clad light-conducting fiber comprising a core, a cladding of lower refractive index than the core, fused to the core, and a plurality of spots of inhomogeneity such as bubbles wholly within the core, spaced along the length of the light-conducting fiber. These light-conducting, bubble-containing fibers are used in a decorative structure comprising a light source and a suitably mounted group of light-conducting, bubble-containing fibers wherein the light is transmitted into and thereafter through the group of fibers, showing decorative points of light along the length of the fibers as well as at their ends.

17 Claims, 12 Drawing Figures

U.S. Patent     Apr. 1, 1980     4,195,907
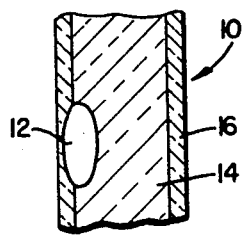
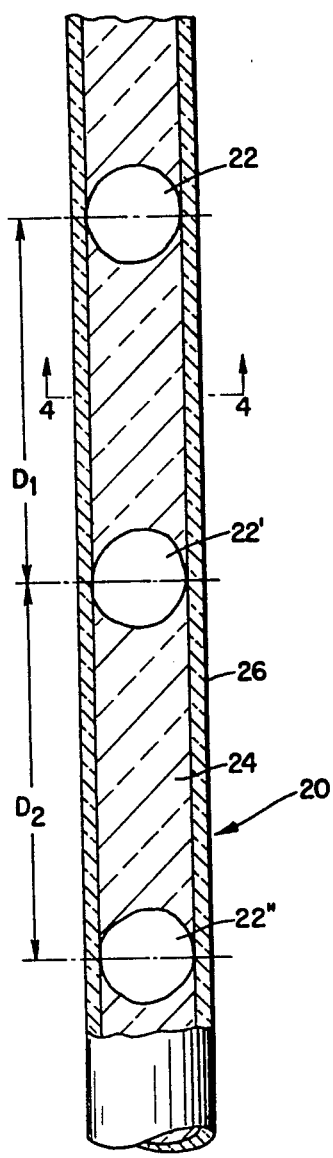
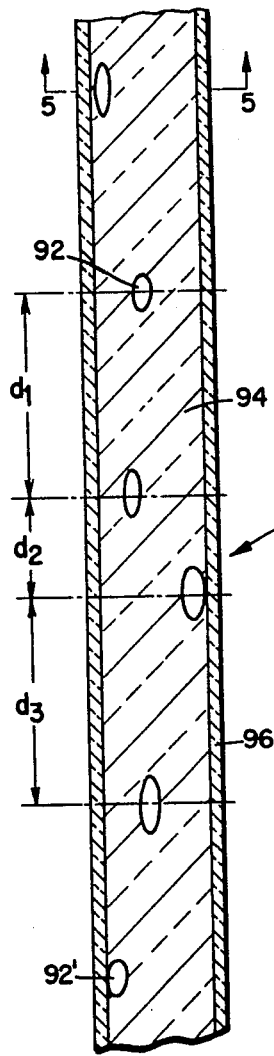
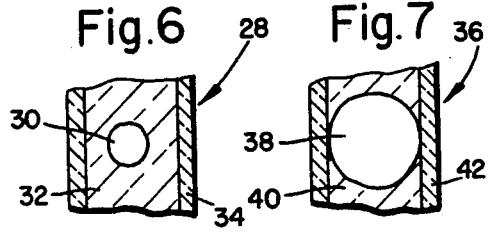
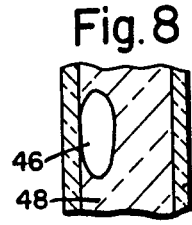
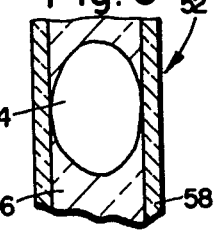
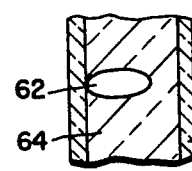
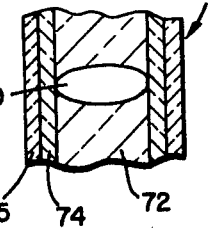
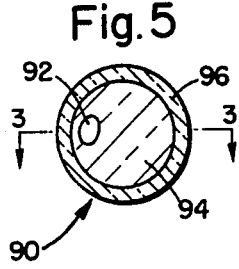
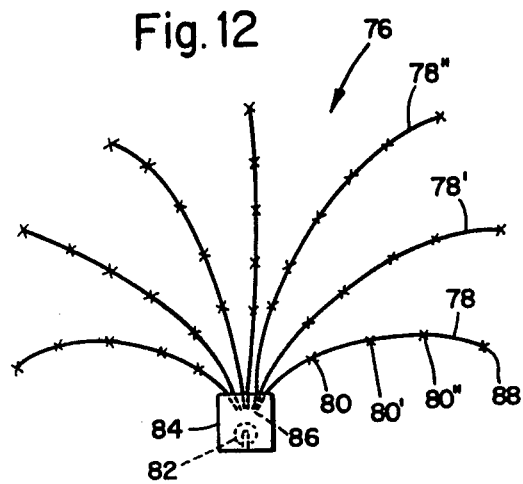

LIGHT-CONDUCTING FIBERS

DESCRIPTION OF THE INVENTION

In the prior art relating to optical fibers, bubbles and other defects have been found to be a disadvantage when they have formed randomly at the interface between the core and the cladding of the fiber, and therefore various patents have been issued showing how to eliminate such bubbles at the core-cladding interface. The present invention relates to an optical light-conducting fiber wherein optical inhomogeneities such as bubbles are formed wholly within the core of the fiber, the cladding maintaining its shape. The spots of inhomogeneity are spaced along the length of the fiber so that at the point where the inhomogeneity such as a bubble is positioned, total internal reflection of light rays transmitted through the fiber does not take place. Such light rays are deflected by the bubbles and pass through the fiber walls. At the point where the light rays pass through the fiber walls, decorative points of light are seen appearing like sparks spaced along the length of the fiber. The expected point of light at the tip of the fiber is also present. In the prior art, decorative structures, such as those of Rosenast U.S. Pat. No. 3,532,874 and Martin U.S. Pat. No. 3,878,503, are well known, but they provide light only at the tips of the optical fibers and not along their length. Points of light along the length of a fiber bundle have heretofore only been known by nicking or cutting of a fiber, such as is shown in Vasilatos U.S. Pat. No. 3,535,018 and in Harrigan U.S. Pat. No. 3,767,910. Siegmund, U.S. Pat. No. 3,920,312 provides bubbles or open channels within the cladding of the fiber, and Siegmund FIG. 5 shows the disadvantages of bubbles which are in the interface between the outer surface of the core and the inner surface of the cladding.

It is therefore an object of the present invention to make an optical fiber substantially free of the disadvantages of the prior art.

Another object of the invention is to make an optical fiber which contains optical inhomogeneities such as bubbles spaced along the length of the fiber.

A further object of the invention is to place these bubbles wholly within the core of the fiber.

Yet another object of the invention is to make a decorative structure comprising optical fibers with points of light spaced along the fibers, without weakening the fibers by nicking or notching.

Additional objects and advantages of the present invention will be apparent to those skilled in the are by reference to the following detailed description and drawings.

FIG. 1 shows a light-conducting fiber of the prior art with a bubble in the core-cladding interface.

FIG. 2 shows a typical light-conducting fiber of the present invention.

FIG. 3 shows another typical light-conducting fiber of the present invention.

FIG. 4 shows a cross section of a typical light-conducting fiber.

FIG. 5 shows a cross section of a typical light-conducting fiber of the present invention.

FIGS. 6–11 show the placement of bubbles in light-conducting fibers of the present invention.

FIG. 12 shows a decorative structure of the present invention.

The objects of the invention are accomplished by providing a clad light-conducting fiber comprising: a core of light-conducting material; a relatively thin substantially uniform thickness of cladding material of lower refractive index than the core, fused to the core, the core and the cladding being interfacially connected for transmitting light through the fiber; and a plurality of optical inhomogeneities such as bubbles wholly within the core spaced along the length of the light-conducting fiber, the outer surface of the core and the inner surface of the cladding being in contact with each other throughout the entire length of the fiber.

Optical light-conducting fibers made of glass or plastic are well known in the prior art. Glass fibers each embody a core of an optical glass having a relatively high index of refraction and a relatively thin cladding surrounding said core of a relatively low index of refraction. These glasses are selected so as to provide the fiber with the desired aperture or light-acceptance angle. For example, an optical flint glass having an index of refraction of 1.75 might be used for forming the core of the fiber and a sode-lime glass having an index of refraction of approximately 1.52 might be used in forming the cladding. The diameter of the core is suitably 10–500 microns and preferably 100–150 microns. The thickness of the cladding is suitably 1–100 microns and preferably 1–10 microns of material of lower refractive index than that of the core. Optical light-conducting fibers of this type are well known in the prior art.

The plurality of optical inhomogeneities such as bubbles, wholly within the core of the fiber, are placed so that neither the cladding nor the interface between the core and the cladding is deformed. A ray of light being internally reflected along the length of the fiber, upon striking a bubble will then be reflected through the wall of the fiber. A viewer will see a point or spark of light at this place along the length of the fiber. The bubbles can be placed according to the desired use of the fiber. When discussing dimensions of the bubbles, length refers to the dimension of the bubble parallel to the length of the fiber and diameter refers to their dimension perpendicular to the length of the fiber. The ratio of the length to diameter of the bubbles is from 1:50 to 50:1 and the diameter of the bubbles is from 1 to 500 microns and preferably from 100 to 150 microns. The diameter of the bubble can be between 1 micron and the diameter of the core of the fiber. When the diameter of the bubble is at a maximum, that is, when the diameter of the bubble equals the diameter of the core of the fiber, the interface between the core and the cladding is tangential to a curved surface of the bubble. The bubble does not extend through the interface but is totally within the core of the fiber.

The bubbles are spaced apart along the length of the light-conducting fiber according to where the sparks of light are desired. The bubbles can be spaced apart 0.1 to 50 centimeters and it is preferred that the bubbles are spaced apart 2 to 10 centimeters along the length of the light-conducting fiber to give the most desired decorative effect of points of light along the length of the light-conducting fiber as well as at its tip. In a decorative structure using bubble-containing, light-conducting fibers, the bubbles normally will be spaced unevenly along the length of the fiber.

The optical fiber can in addition have a mantle surrounding the cladding also made of a homogeneous material of lower refractive index than the core. This mantle can be colored as may be desirable. A black mantle would emphasize the points of light emerging from the fiber at the points where the bubbles are located.

Bubble containing fibers with a colored mantle are particularly useful in making the decorative structures described herein.

The invention can be more easily understood by reference to the figures.

FIG. 1 shows a light-conducting fiber 10 of the prior art in which a bubble 12 is partly within the core 14 and partly within the cladding 16 of the fiber 10. Such bubbles 12 are randomly and unpredictably placed within the fiber 10.

FIG. 2 shows a typical light-conducting fiber 20 of the present invention wherein the bubble 22 is wholly within the core 24 of the fiber 20 and cladding 26 is tangential to the bubble 22. The bubbles 22, 22', 22'', are more or less evenly spaced along the length of fiber 20 such that $D_1$ and $D_2$ are approximately equal to each other and are equal to 0.1 to 50 cm and preferably 2 to 10 cm.

FIG. 3 shows another typical light-conducting fiber 90 of the present invention wherein the bubbles 92, 92' are wholly within the core 94 of the fiber 90 and cladding 96 is tangential to bubble 92'. The bubbles 92, 92' are spaced along the length of the fiber such that $d_1$, $d_2$, $d_3$ are not necessarily equal to each other and are equal to 0.1 to 50 cm and preferably 2 to 10 cm.

FIG. 4 shows a cross-section taken at 4—4' on FIG. 2 wherein fiber 20 comprises core 24 and cladding 26.

FIG. 5 shows a cross-section taken at 5—5' on FIG. 3 wherein fiber 90 comprises core 94, cladding 96, and bubble 92 wholly within the core 94 of fiber 90.

FIGS. 6 through 11 show different sizes and positions of bubbles wholly within the core of the fiber. It is to be understood that bubbles such as these are spaced along the length of the fiber as is shown in FIGS. 2 and 3.

In FIG. 6 the bubble 30 is placed in the core 32 of the fiber 28 so that the bubble 30 does not touch the cladding 34. In FIG. 7 the diameter of the bubble 38 is the same as that of the core 40 of the fiber 36. The cladding 42 is tangential to bubble 38. FIGS. 6 and 7 show spherical bubbles 30 and 38 respectively. FIGS. 8 and 9 show bubbles in which the length of the bubble is greater than its diameter. FIG. 8 shows a bubble 46 wholly within the core 48 of fiber 44. The length of bubble 46 is greater than its diameter, and the diameter of bubble 46 is less than that of core 48. The cladding 50 is tangential to bubble 46. FIG. 9 shows a bubble 54 wholly within the core 56 of fiber 52 where the length of bubble 54 is greater than its diameter, and the diameter of bubble 54 equals the diameter of the core 56 of fiber 52. Cladding 58 is tangential to bubble 54.

FIGS. 10 and 11 show typical examples where the length of the bubble is less than its diameter. FIG. 10 shows a fiber 60 with a bubble 62 wholly within the core 64. The diameter of bubble 62 is less than that of core 64. Cladding 66 is tangential to bubble 62. FIG. 11 shows fiber 68 which contains bubble 70 wholly within the core 72 of the fiber 68. The length of bubble 70 is less than its diameter and the diameter of bubble 70 is equal to the diameter of core 72 of fiber 68. Cladding 74 is tangential to bubble 70. The fiber 68 further comprises a mantle 75 surrounding cladding 74.

FIG. 12 shows a decorative structure 76 of the present invention. Decorative structure 76 comprises light-conducting fibers 78, 78', 78'', showing points of light 80, 80', 80'', etc. along with the length of each fiber as well as point of light 88 at the tip of fiber 78. The fibers 78, 78', 78'', etc. are grouped together in a mounting means 84 so that light source 82 shines into mounting means 84 and illuminates the grouped end 86 of fibers 78, 78', 78'', etc.

In general, the desired optical inhomogeneities in the fibers of the present invention can be created by the same procedures that have in the past resulted in undesirable bubbles. Alternatively, the fibers can be subjected to rapid localized heating creating a crack in the core without damaging the cladding. This crack can then be expanded into a bubble by further heat treatment at temperatures at which the surface tension of the glass causes bubble formation. Other means of producing the structures of the present invention will be readily apparent to those skilled in the art.

Although the invention has been described in considerable detail with reference to certain preferred embodiments thereof, it will be understood that variations and modifications can be effected within the spirit and scope of the invention as described above and as defined in the appended claims.

What is claimed is:

1. A clad light-conducting fiber comprising:
   A. a core of light-conducting material;
   B. a relatively thin substantially uniform thickness of cladding material of lower refractive index than said core, fused to said core, said core and said cladding being interfacially connected for transmitting light through said fiber, wherein the outer surface of the core and the inner surface of the cladding are in contact with each other throughout the entire length of the fiber;
   C. a plurality of optical inhomogeneities wholly within said core spaced along the length of the light-conducting fiber.

2. A clad light-conducting fiber comprising:
   A. a core of light-conducting material of diameter 10 to 500 microns;
   B. a substantially uniform cladding of thickness 1 to 100 microns of material of lower refractive index than said core, fused to said core at an interface;
   C. a plurality of bubbles, wholly within the core, the ratio of the length to diameter of said bubbles being from 1:50 to 50:1 and the diameter of said bubbles being between 1 and 500 microns, said bubbles being spaced apart 0.1 to 50 cm along the length of the light-conducting fiber,
   wherein the interface is tangential to a curved surface of said bubbles.

3. A clad light-conducting fiber comprising:
   A: a core of light-conducting material of 100 to 150 microns in diameter;
   B. a substantially uniform cladding of thickness 1 to 10 microns of material of lower refractive index than said core fused to said core at an interface;
   C. a plurality of bubbles wholly within the core, the ratio of the length to diameter of said bubbles being from 1:50 to 50:1, and the diameter of said bubbles being between 1 micron and 150 microns, said bubbles being spaced apart 2 to 10 cm along the length of the light-conducting fiber
   wherein the interface is tangential to a curved surface of said bubbles.

4. The clad light-conducting fiber of claim 1 wherein a ray of light striking an optical inhomogeneity passes through the optical fiber wall.

5. The clad light-conducting fiber of claim 2 wherein the diameter of the core is between 100 microns and 150 microns.

6. The clad light-conducting fiber of claim 2 wherein the cladding is of thickness 1 to 10 microns.

7. The clad light-conducting fiber of claim 2 wherein the diameter of the bubbles is between 1 micron and 150 microns.

8. The clad light-conducting fiber of claim 2 wherein the interval between adjacent bubbles is 2 to 10 cm along the length of the fiber.

9. The clad light-conducting fiber of claim 2 wherein a ray of light striking a bubble passes out of the optical fiber wall.

10. The clad light-conducting fiber of claim 2 wherein the interface is free of distortions by bubbles.

11. An optical fiber comprising a light-conducting core of a normal optical, homogeneous material and surrounding this core, at least one cladding of a material whose refractive index is lower than that of the core, so that light entering the core at a specified angle is reflected back into the core at the intersection of the core and the cladding due to total reflection, characterized in that the core consists of a material which contains bubbles wholly surrounded by the core, by which the light is deflected so that it enters the cladding at too great an angle to be reflected back into the core by total reflection, and the light at these places in the fiber exits to the outside through the cladding.

12. An optical fiber of claim 11 further comprising a mantle surrounding the cladding.

13. An optical fiber of claim 12 wherein the mantle is colored.

14. An optical fiber of claim 13 wherein the mantle is colored black.

15. A decorative structure comprising:
A. a light source;
B. a plurality of clad light-conducting fibers having one end thereof grouped together, said light-conducting fibers comprising a core, a cladding, and a plurality of optical inhomogeneities spaced apart wholly surrounded by said core, and said light-conducting fibers being flexible and bendable under their own weight;
C. means for mounting said grouped end of said flexible light-conducting fibers in an upright position over and in proximity with said light source whereby light is transmitted into said grouped end and thereafter through said flexible light-conducting fibers.

16. A decorative structure comprising:
A. a light source;
B. a plurality of clad light-conducting fibers which are flexible and which will bend under their own weight, the fibers having one end grouped together, each fiber comprising:
1. a core of light-conducting material of 100 to 150 microns in diameter;
2. a substantially uniform cladding of thickness 1 to 10 microns of material of lower refractive index than said core, fused to said core at an interface;
3. a plurality of bubbles wholly within the core, the ratio of the length to diameter of said bubbles being from 1:50 to 50:1, and the diameter of said bubbles being between 1 micron and 150 microns, said bubbles being spaced apart 2 to 10 cm along the length of the light-conducting fiber; wherein the interface is tangential to a curved surface of said bubbles,
C. means for mounting said grouped end of said light-conducting fibers in an upright position over and in proximity with said light source whereby light is transmitted into said grouped end and thereafter through said light-conducting fibers.

17. A clad light-conducting fiber comprising:
A. a core of light-conducting material;
B. a relatively thin substantially uniform thickness of cladding material of lower refractive index than said core, fused to said core, said core and said cladding being interfacially connected for transmitting light through said fiber, wherein the outer surface of the core and the inner surface of the cladding are in contact with each other throughout the entire length of the fiber;
C. a plurality of optical inhomogeneities wholly within said core, the inhomogeneities being wholly surrounded by said core, and being spaced along the length of the light-conducting fiber.

* * * * *